United States Patent
Sharma et al.

(10) Patent No.: US 9,827,557 B2
(45) Date of Patent: Nov. 28, 2017

(54) NAPHTHA REFORMING PROCESS

(71) Applicant: Reliance Industries Limited, Mumbai (IN)

(72) Inventors: Nagesh Sharma, Vadodara (IN); Ajay Kumar, Vadodara (IN); Anilkumar Mettu, Guntur (IN); Veera Venkata Satya Bhaskara Sita Rama Murthy Katravulapalli, Hyderabad (IN); Kalpana Gopalakrishna, Akota Vadodara (IN); Raksh Vir Jasra, Vadodara (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 15/119,942

(22) PCT Filed: Feb. 26, 2015

(86) PCT No.: PCT/IB2015/051424
§ 371 (c)(1),
(2) Date: Aug. 18, 2016

(87) PCT Pub. No.: WO2015/128824
PCT Pub. Date: Sep. 3, 2015

(65) Prior Publication Data
US 2017/0051212 A1    Feb. 23, 2017

(30) Foreign Application Priority Data

Feb. 28, 2014   (IN) .......................... 717/MUM/2014

(51) Int. Cl.
| | | |
|---|---|---|
| *C10G 35/06* | (2006.01) | |
| *B01J 29/068* | (2006.01) | |
| *C10G 35/09* | (2006.01) | |
| *C10G 35/095* | (2006.01) | |
| *B01J 37/02* | (2006.01) | |
| *B01J 29/44* | (2006.01) | |
| *B01J 29/48* | (2006.01) | |
| *B01J 29/42* | (2006.01) | |
| *B01J 37/06* | (2006.01) | |
| *B01J 37/08* | (2006.01) | |
| *B01J 29/072* | (2006.01) | |
| *B01J 29/076* | (2006.01) | |
| *B01J 29/08* | (2006.01) | |
| *B01J 29/18* | (2006.01) | |
| *B01J 29/40* | (2006.01) | |
| *B01J 29/70* | (2006.01) | |
| *B01J 35/02* | (2006.01) | |

(52) U.S. Cl.
CPC .......... *B01J 29/068* (2013.01); *B01J 29/072* (2013.01); *B01J 29/076* (2013.01); *B01J 29/084* (2013.01); *B01J 29/18* (2013.01); *B01J 29/40* (2013.01); *B01J 29/42* (2013.01); *B01J 29/44* (2013.01); *B01J 29/48* (2013.01); *B01J 29/7007* (2013.01); *B01J 29/7034* (2013.01); *B01J 29/7038* (2013.01); *B01J 37/0236* (2013.01); *B01J 37/0242* (2013.01); *B01J 37/0246* (2013.01); *B01J 37/06* (2013.01); *B01J 37/08* (2013.01); *C10G 35/09* (2013.01); *C10G 35/095* (2013.01); *B01J 35/023* (2013.01); *B01J 2229/186* (2013.01)

(58) Field of Classification Search
CPC .............................. C10G 35/06; C10G 35/065
See application file for complete search history.

(56) References Cited

U.S. PATENT DOCUMENTS

| | | | | |
|---|---|---|---|---|
| 4,435,608 A | * | 3/1984 | Koetsier | ................. B01J 29/86 585/480 |
| 5,077,253 A | * | 12/1991 | Chu | ....................... B01J 33/00 502/61 |
| 7,186,873 B2 | | 3/2007 | Feng et al. | |
| 2006/0149104 A1 | | 7/2006 | Mohr et al. | |
| 2008/0314798 A1 | * | 12/2008 | Stockwell | ............. B01J 29/084 208/118 |
| 2014/0256538 A1 | * | 9/2014 | Yoon | ...................... C01B 37/02 502/67 |

FOREIGN PATENT DOCUMENTS

AU          407289        12/1964

* cited by examiner

*Primary Examiner* — Randy Boyer
(74) *Attorney, Agent, or Firm* — Fish IP Law, LLC (57) ABSTRACT

The present disclosure relates to a naphtha reforming process for obtaining reformed naphtha comprising contacting naphtha with a catalyst, the catalyst comprising a chloride free zeolite coated alumina support impregnated with 0.01 wt % to 0.5 wt % active metal and 0.01 wt % to 0.5 wt % promoter metal, wherein the thickness of the zeolite coating on the alumina support ranges from 100 μm to 200 μm, which results in formation of reformed products of naphtha and ethylbenzene formed in-situ.

4 Claims, 7 Drawing Sheets

NAPHTHA REFORMING PROCESS

FIELD OF THE DISCLOSURE

The present disclosure relates to a naphtha reforming process.

DEFINITIONS

An active metal is a Group VIII metal of the modern periodic table. The Group VIII metals are platinum (Pt), palladium (Pd) and nickel (Ni), A promoter metal is a Group IV metal of the modern periodic table. The Group IV metals are tin (Sn), rhenium (Re) and iridium (Ir).

ZSM-5 is an aluminosilicate zeolite belonging to the pentasil family of zeolites and its chemical formula is $Na_nAl_nSi_{96-n}O_{192}.16H_2O$ ($0<n<27$).

Mordenite is a zeolite mineral with the chemical formula $Al_2Si_{10}O_{24}.7H_2O$.

Ultra-stable Y (USY) zeolite is a form of type Y zeolite with the majority of sodium ions removed and treated thermally to enhance its thermal and steam stability.

H-beta zeolite is a high-silica content zeolite having full three dimensional 12-ring pore system.

MCM-22 is a type of zeolite having unique phase and good crystallinity.

ZSM-12 is a type of pentasil zeolite having silica to alumina ratio above 33.

Liquid Hourly Space Velocity (LHSV) is a volumetric flow-rate of the reactants divided by the catalyst bed volume (or the reactor volume).

BACKGROUND

Catalytic naphtha reforming is an important industrial process. During the naphtha reforming process, mainly low-octane straight chain alkanes (paraffins), with 6-10 carbon atoms, are reformed into molecules having branched alkanes (isoparaffins) and cyclic naphthenes, which are then partially dehydrogenated to produce high-octane aromatic hydrocarbons such as benzene, toluene and xylenes (BTX) in the reformate. The naphtha feedstock used for catalytic reforming contains naphthenic hydrocarbons, paraffinic hydrocarbons and aromatic hydrocarbons of different carbon numbers. The major reactions in naphtha reforming process include dehydrogenation of naphthenes, dehydrocyclization of paraffins, isomerization of paraffins and hydrocracking. The chemical reactions in reforming process occur in presence of a catalyst and a high partial pressure of hydrogen. In a typical reforming process, naphtha is processed over conventional acidic reforming catalysts which results in undesired products.

In the catalytic naphtha reforming process, the $C_8$ aromatic isomers formed i.e., ethyl benzene (EB), para-xylenes (p-X), meta-xylenes (m-X), and ortho-xylenes (o-X) appear in thermodynamic equilibrium in the product. Conventionally, the ethyl benzene formed in the reforming reactor takes an idle ride in the post reforming downstream p-xylene recovery unit, thus occupying unit capacity and leading to undesired operating cost.

There is, therefore, a need for a naphtha reforming process. Further, there is a need to improve the yield of benzene ($C_6$) and toluene ($C_7$) during the naphtha reforming process. Furthermore, there is a need to reduce the undesired operating cost of the p-xylene recovery unit.

OBJECTS

Some of the objects of the present disclosure, which at least one embodiment herein satisfies, are as follows:

It is an object of the present disclosure to provide a naphtha reforming process.

It is another object of the present disclosure to improve the yield of benzene and toluene during the naphtha reforming process.

It is yet another object of the present disclosure to reduce the undesired operating cost of a p-xylene recovery unit.

It is still another object of the present disclosure to ameliorate one or more problems associated with the conventional catalyst or at least provide a useful alternative.

Other objects and advantages of the present disclosure will be more apparent from the following description which is not intended to limit the scope of the present disclosure.

SUMMARY

The present disclosure provides a naphtha reforming process for obtaining reformed naphtha comprising contacting naphtha with a catalyst, the catalyst comprising a chloride free zeolite coated alumina support impregnated with 0.01 wt % to 0.5 wt % active metal and 0.01 wt % to 0.5 wt % promoter metal, wherein the thickness of the zeolite coating on the alumina support ranges from 100 μm to 200 μm, which results in formation of reformed products of naphtha and ethylbenzene formed in-situ.

In accordance with the present disclosure, the in-situ ethylbenzene is dealkylated into benzene ($C_6$) and/or toluene ($C_7$).

The ethylbenzene formed in the reformed products is in the range of 3.6 wt % to 4.75 wt %.

The ethyl benzene formed in the reformed product is in the range of 4.68 wt % to 4.75 wt % of the mass of the reformed products.

The zeolite is at least one selected from a group consisting of ZSM-5, mordenite, USY, H-Beta, MCM-22, and ZSM-12.

BRIEF DESCRIPTION OF THE ACCOMPANYING DRAWINGS

The disclosure will now be described with reference to the accompanying non-limiting drawings.

DETAILED DESCRIPTION

The present disclosure provides a naphtha reforming process for obtaining reformed naphtha comprising contacting naphtha with a catalyst, the catalyst comprising a chloride free zeolite coated alumina support impregnated with 0.01 wt % to 0.5 wt % active metal and 0.01 wt % to 0.5 wt % promoter metal, wherein the thickness of the zeolite coating on the alumina support ranges from 100 μm to 200 μm, which results in formation of reformed products of naphtha and ethylbenzene formed in-situ.

In accordance with the present disclosure, the in-situ ethylbenzene is dealkylated into benzene ($C_6$) and/or toluene ($C_7$).

The ethylbenzene formed in the reformed products is in the range of 3.6 wt % to 4.75 wt %.

The ethyl benzene formed in the reformed product is in the range of 4.68 wt % to 4.75 wt % of the mass of the reformed products.

Examples of the zeolite include ZSM-5, mordenite, USY, H-Beta, MCM-22, and ZSM-12.

In accordance with one embodiment, the zeolite is ZSM-5 comprising $SiO_2$ and $Al_2O_3$.

In accordance with the present disclosure, the ratio of $SiO_2$ to $Al_2O_3$ in the ZSM-5 catalyst ranges from 10:1 to 20:1.

In accordance with another embodiment, the ratio of $SiO_2$ to $Al_2O_3$ in the ZSM-5 catalyst is 15:1.

Examples of the active metals include platinum (Pt), palladium (Pd) and nickel (Ni).

In accordance with one embodiment, the active metal is platinum (Pt).

Examples of the promoter metals include tin (Sn), rhenium (Re) and Iridium (Ir).

In accordance with one embodiment, the promoter metal is tin (Sn).

In accordance with the present disclosure, the reforming reaction during the naphtha reforming process is at least one selected from the group consisting of dehydrogenation of naphthenes, dehydrocyclization of paraffins, isomerization of paraffins, and hydrocracking of paraffins.

In accordance with an exemplary embodiment, the desirable reforming reactions during naphtha reforming process are dehydrogenation of naphthenes, isomerization of paraffins, and dehydrocyclization of paraffins.

The yield of ethylbenzene (wt %) obtained in presence of the catalyst of the present disclosure reduces by 10% as compared to that obtained in presence of the conventional catalyst. Further, ethylbenzene formed during the reforming process is dealkylated to obtain benzene ($C_6$) and/or toluene ($C_7$). This results in reduction of energy/operating cost of the downstream p-xylene recovery unit/s.

The present disclosure is further illustrated herein below with the help of the following examples. The examples used herein are intended merely to facilitate an understanding of the ways in which the embodiments herein may be practiced and to further enable those of skilled in the art to practice the embodiments herein. Accordingly, the examples should not be construed as limiting the scope of the embodiments herein.

The reformed naphtha (products) obtained by the reforming process carried out at a pressure of 7.3 kg/cm$^2$, LHSV of 1.95 h$^{-1}$, hydrogen to hydrocarbon molar ratio of 4 and at a temperature range between 500° C. and 600° C. The yields of the reformed products obtained from the reforming process are illustrated in the following Table 1. Further, the deposition of coke (%) on the conventional catalyst during the naphtha reforming process is greater than the catalyst of the present disclosure which is depicted in Table 2.

TABLE 1 illustrates the yields of the reformed naphtha (products) obtained by the reforming process carried out in presence of the conventional catalyst and the catalyst of the present disclosure.

| | Conventional catalyst | | | Catalyst of the present disclosure (Catalyst-A) | | |
|---|---|---|---|---|---|---|
| | Time (hours) | | | | | |
| | 7 | 17 | 30 | 7 | 17 | 30 |
| | Bed Temperature (° C.) | | | | | |
| Products | 521 | 521 | 521 | 521 | 521 | 521 |
| $H_2$ | 2.11 | 2.11 | 2.11 | 1.85 | 1.85 | 1.85 |
| $C_1$ | 1.11 | 1.11 | 1.11 | 0.68 | 0.68 | 0.68 |
| $C_2$ | 2.10 | 2.10 | 2.10 | 1.00 | 1.00 | 1.00 |
| $C_3$ | 3.71 | 3.71 | 3.71 | 3.20 | 3.20 | 3.20 |
| $iC_4$ | 1.93 | 1.93 | 1.93 | 2.14 | 2.14 | 2.14 |
| $nC_4$ | 2.29 | 2.29 | 2.29 | 1.93 | 1.93 | 1.93 |
| Total gas yield | 13.25 | 13.25 | 13.25 | 10.80 | 10.80 | 10.80 |
| $C_6$ | 1.30 | 1.34 | 1.15 | 1.60 | 1.30 | 1.18 |
| $C_7$ | 16.65 | 16.29 | 15.21 | 17.31 | 16.37 | 15.73 |
| Ethylbenzene (EB) | 5.13 | 5.02 | 4.65 | 4.75 | 4.77 | 4.66 |
| p-xylene (PX) | 6.10 | 6.15 | 5.58 | 6.17 | 5.93 | 5.65 |
| m-xylene (MX) | 13.56 | 13.64 | 12.76 | 13.64 | 13.11 | 12.46 |
| o-xylene (OX) | 7.36 | 7.12 | 6.41 | 7.64 | 7.34 | 6.88 |
| $C_8$ | 32.14 | 31.93 | 29.39 | 32.20 | 31.15 | 29.65 |
| $C_9$ | 19.58 | 19.60 | 17.62 | 19.89 | 19.72 | 19.03 |
| $C_{10}$ | 4.55 | 4.64 | 4.22 | 4.40 | 4.70 | 4.67 |
| $C_{11+}$ | 1.30 | 0.00 | 0.00 | 1.07 | 0.88 | 0.79 |
| Total aromatic | 75.52 | 73.80 | 67.58 | 76.47 | 74.12 | 71.05 |
| $C_{5+}$ | 86.75 | 86.75 | 86.75 | 89.20 | 89.20 | 89.20 |
| EB/PX | 0.840 | 0.817 | 0.833 | 0.770 | 0.804 | 0.825 |

The comparative analysis of the yields is further described in detail in the following examples:

Example 1 Yield of Ethylbenzene (EB)

Table 1 shows that the yield of ethylbenzene obtained in presence of the catalyst of the present disclosure is 4.73 wt % which is less than the yield of ethylbenzene (5.13 wt %) obtained in presence of the conventional catalyst. It is observed that the yield of ethylbenzene obtained in presence of the catalyst is reduced approximately by 10% as compared to that obtained in presence of the conventional catalyst.

Figure 1:
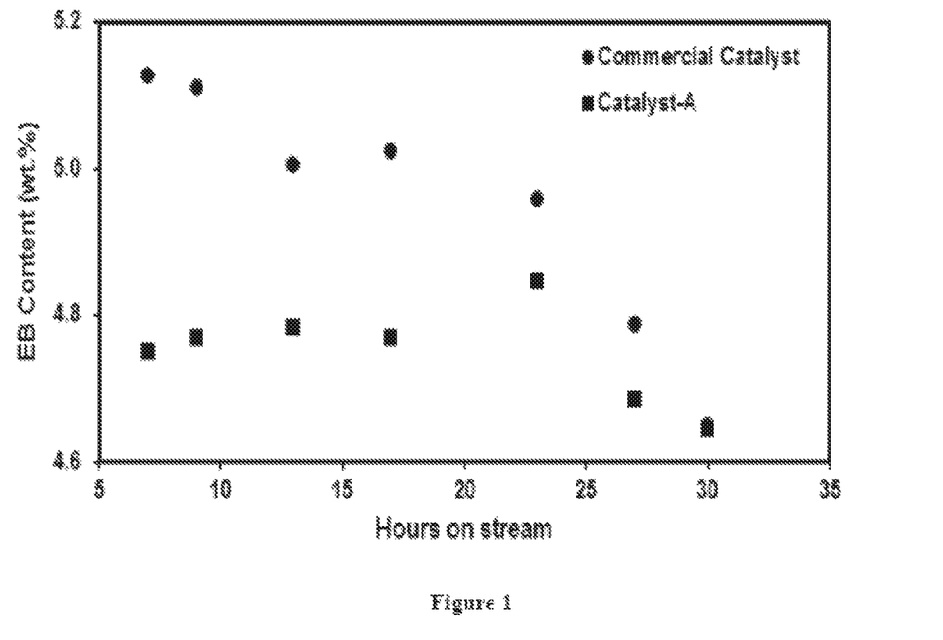
FIG. 1 illustrates the graph depicting the yield of ethyl benzene (wt %) obtained by reforming of naphtha in presence of the conventional catalyst and a catalyst in accordance with the present disclosure.

Further, same can be shown by FIG. 1 which illustrates the graph depicting the yield of ethyl benzene (wt %) obtained by reforming of naphtha in presence of the conventional catalyst and a catalyst in accordance with the present disclosure. FIG. 1 shows that the yield of ethylbenzene in presence of the catalyst of the present disclosure is decreased as compared to that obtained in presence of the conventional catalyst.

Example 2 Ethylbenzene (EB) to p-Xylene (PX) Ratio

Table 1 shows that the ratio of ethylbenzene to p-xylene obtained in presence of the catalyst of the present disclosure is 0.770 which is less than the ratio (0.840) of ethylbenzene to p-xylene obtained in presence of the conventional catalyst.

Figure 2:
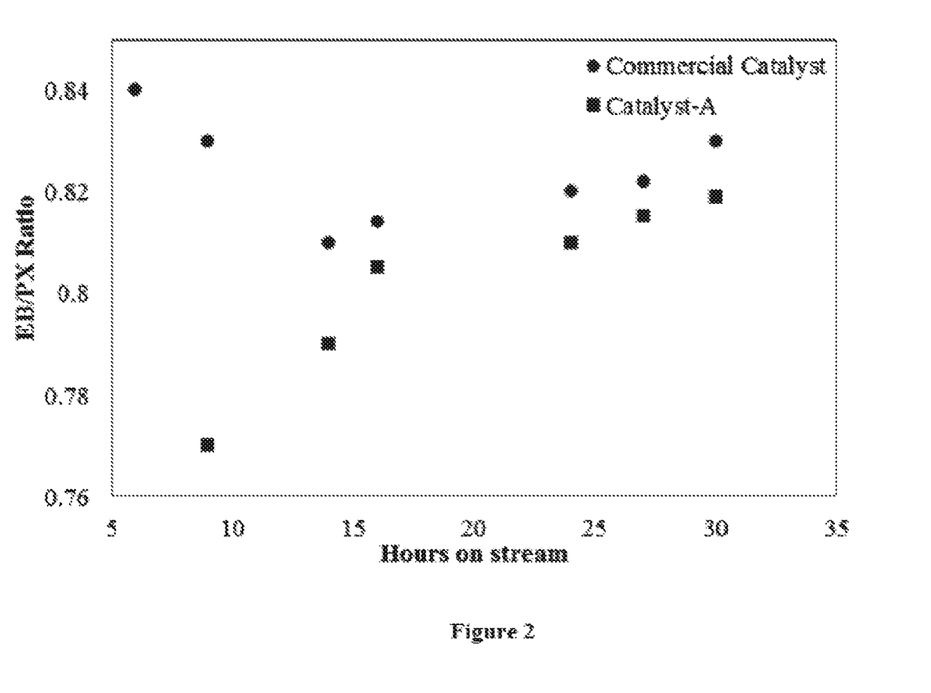
FIG. 2 illustrates the graph depicting the ratio of ethyl benzene (wt %) to p-xylene obtained by reforming of naphtha in presence of the conventional catalyst and the catalyst in accordance with the present disclosure.

Further, same can be shown by FIG. 2 which illustrates the graph depicting the ratio of ethyl benzene (wt %) to p-xylene obtained by reforming of naphtha in presence of the conventional catalyst and the catalyst in accordance with the present disclosure.

FIG. 2 shows that the ratio of ethyl benzene (wt %) to p-xylene obtained in presence of the catalyst of the present disclosure is decreased as compared to that obtained in presence of the conventional catalyst.

Example 3 Yield of Benzene ($C_6$)

Table 1 shows that the yield of benzene obtained in presence of the catalyst of the present disclosure is 1.60 wt % which is greater than the yield of benzene (1.30 wt %) obtained in presence of the conventional catalyst.

Figure 3:
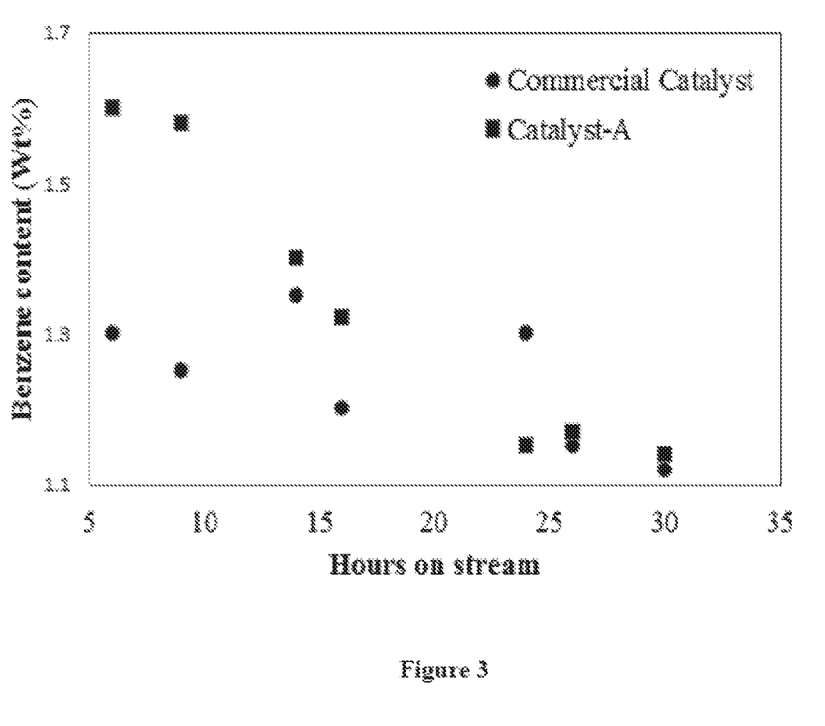
FIG. 3 illustrates the graph depicting the yield of benzene (wt %) obtained by reforming of naphtha in presence of the conventional catalyst and a catalyst in accordance with the present disclosure.

Further, same can be shown by FIG. 3 which illustrates the graph depicting the yield of benzene (wt %) obtained by reforming of naphtha in presence of the conventional catalyst and a catalyst in accordance with the present disclosure.

FIG. 3 shows that the yield of benzene (wt %) obtained in presence of the catalyst of the present disclosure is increased as compared to that obtained in presence of the conventional catalyst.

Example 4 Yield of Toluene (wt %)

Table 1 shows that the yield of toluene obtained in presence of the catalyst of the present disclosure is 17.31 wt % which is greater than the yield of toluene (16.65 wt %) obtained in presence of the conventional catalyst.

Figure 4:
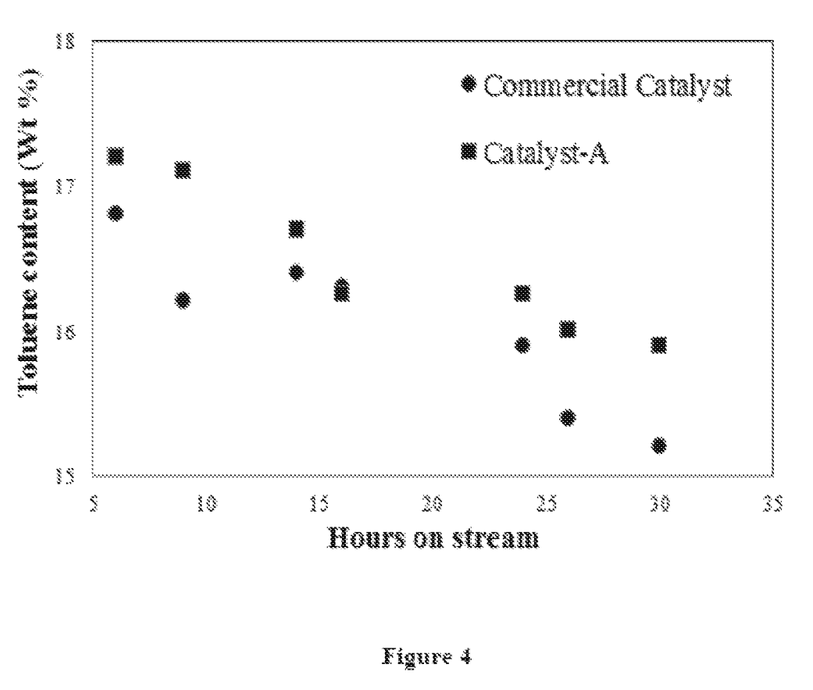
FIG. 4 illustrates the graph depicting the yield of toluene (wt %) obtained by reforming of naphtha in presence of the conventional catalyst and a catalyst in accordance with the present disclosure.

Further, same can be shown by FIG. 4 which illustrates the graph depicting the yield of toluene (wt %) obtained by reforming of naphtha in presence of the conventional catalyst and a catalyst in accordance with the present disclosure.

FIG. 4 shows that the yield of toluene (wt %) obtained in presence of the catalyst of the present disclosure is increased as compared to that obtained in presence of the conventional catalyst.

Example 5 Yield of $C_8$ Aromatic Hydrocarbon (wt %)

Table 1 shows that the yield of $C_8$ aromatic hydrocarbons obtained in presence of the catalyst of the present disclosure is 32.20 wt % which is equivalent or marginally greater than the yield of $C_8$ aromatic hydrocarbon (32.14 wt %) obtained in presence of the conventional catalyst.

Figure 5:
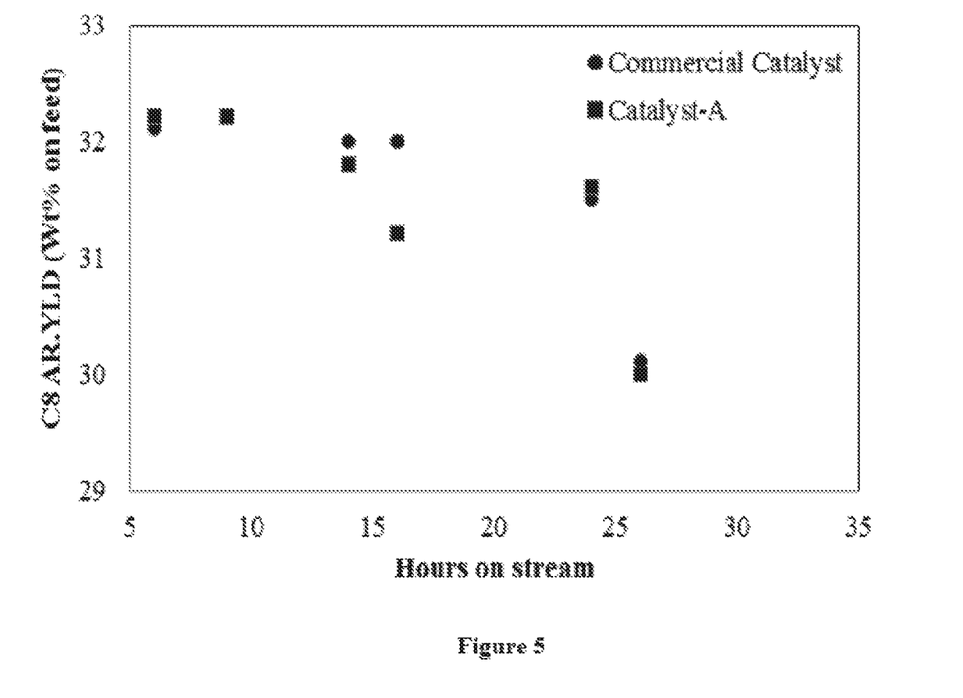
FIG. 5 illustrates the graph depicting the yield of $C_8$ aromatic hydrocarbon (wt %) obtained by reforming of naphtha in presence of the conventional catalyst and a catalyst in accordance with the present disclosure.

Further, same can be shown by FIG. 5 which illustrates the graph depicting the yield of $C_8$ hydrocarbons (wt %) obtained by reforming of naphtha in presence of the conventional catalyst and a catalyst in accordance with the present disclosure.

FIG. 5 shows that the yield of $C_8$ aromatic hydrocarbon (wt %) obtained in presence of the catalyst of the present disclosure is equivalent or marginally greater as compared to that obtained in presence of the conventional catalyst.

Example 6 Total Aromatics Yield (wt %)

Table 1 shows that the yield of total aromatics obtained in presence of the catalyst of the present disclosure is 76.47 wt % which is equivalent or marginally greater than the yield of total aromatics (75.50 wt %) obtained in presence of the conventional catalyst.

Figure 6:
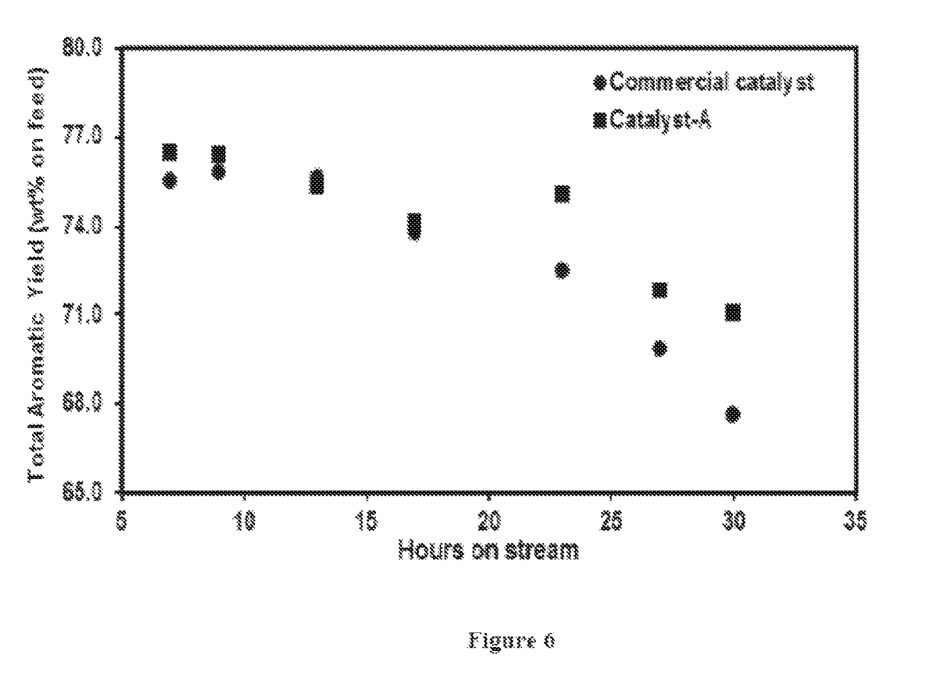
FIG. 6 illustrates the graph depicting the yield of total aromatics (wt %) obtained by reforming of naphtha in presence of the conventional catalyst and a catalyst in accordance with the present disclosure.

Further, same can be shown by FIG. 6 which illustrates the graph depicting the yield of total aromatics (wt %) obtained by reforming of naphtha in presence of the conventional catalyst and a catalyst in accordance with the present disclosure.

FIG. 6 shows that the yield of total aromatics (wt %) obtained in presence of the catalyst of the present disclosure is equivalent or marginally greater as compared to that obtained in presence of the conventional catalyst.

Example 6 Yield of $C_{5+}$ Aromatic Hydrocarbons (wt %)

Table 1 shows that the yield of $C_{5+}$ aromatic hydrocarbons obtained in presence of the catalyst of the present disclosure is 89.20 wt % which is greater than the yield of $C_{5+}$ aromatic hydrocarbons (86.75 wt %) obtained in presence of the conventional catalyst.

Figure 7:
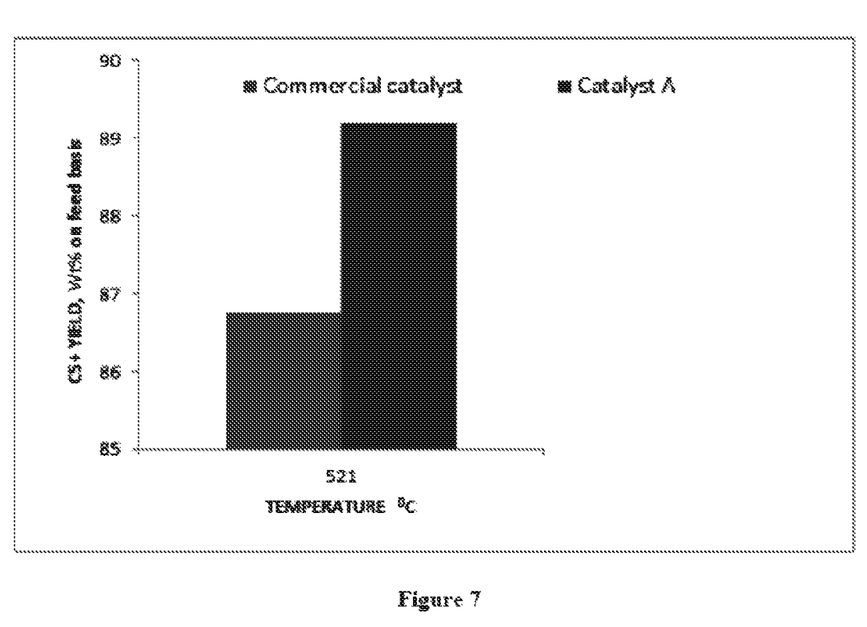
FIG. 7 illustrates the graph depicting the yield of $C_{5+}$ aromatic hydrocarbons (wt %) obtained by reforming of naphtha in presence of the conventional catalyst and a catalyst in accordance with the present disclosure.

Further, same can be shown by FIG. 7 which illustrates the graph depicting the yield of $C_{5+}$ aromatic hydrocarbons (wt %) obtained by reforming of naphtha in presence of the conventional catalyst and a catalyst in accordance with the present disclosure.

FIG. 7 shows that the yield of $C_{5+}$ aromatic hydrocarbons (wt %) obtained in presence of the catalyst of the present disclosure is greater as compared to that obtained in presence of the conventional catalyst.

TABLE 2 illustrates the deposition of coke (%) per Kg of feed processed on the conventional catalyst and the catalyst of the present disclosure.

| Sample | % coke per Kg of feed processed |
|---|---|
| Conventional catalyst | 6.1 |
| Catalyst of the present disclosure | 5.7 |

Table 2 indicates that due to less deposition of coke on the catalyst of the present disclosure, deactivation of the catalyst is slow and the catalytic activity of the catalyst is improved.

It is observed from the above description that the reforming process carried out in presence of the catalyst of the present disclosure overcomes the drawbacks associated with the reforming process carried out in presence of the conventional catalyst.

TECHNICAL ADVANCEMENT

The present disclosure relates to the naphtha reforming process. The process has several technical advancements:
 the yield of benzene ($C_6$) and toluene ($C_7$) is improved;
 the yield of ethyl benzene is reduced; and
 the energy/operating cost of the p-xylene recovery unit is reduced due to reduction in the yield of ethyl benzene during the naphtha reforming process.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

The invention claimed is:

1. A naphtha reforming process for obtaining reformed naphtha comprising contacting naphtha with a catalyst, said catalyst comprising a chloride free zeolite coated alumina support impregnated with 0.01 wt % to 0.5 wt % active metal and 0.01 wt % to 0.5 wt % promoter metal, wherein the thickness of the zeolite coating on the alumina support ranges from 100 μm to 200 μm, which results in formation of reformed products of naphtha and ethylbenzene formed in-situ.

2. The naphtha reforming process as claimed in claim 1, wherein said in-situ ethylbenzene is dealkylated into benzene ($C_6$) and/or toluene ($C_7$).

3. The naphtha reforming process as claimed in claim 1, wherein the ethylbenzene formed in the reformed products is in the range of 3.6 wt % to 4.75 wt % of the mass of the reformed products.

4. The naphtha reforming process as claimed in claim 1, wherein the ethylbenzene formed in the reformed products is in the range of 4.68% to 4.75% of the mass of the reformed products.

\* \* \* \* \*